Oct. 26, 1926.

S. G. DOWN 1,604,267

AUTOMOTIVE BRAKE

Filed Jan. 6, 1926

INVENTOR
SIDNEY G. DOWN
BY Wm. M. Cady
ATTORNEY

Patented Oct. 26, 1926.

1,604,267

UNITED STATES PATENT OFFICE.

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed January 6, 1926. Serial No. 79,552.

This invention relates to vehicle brakes, and more particularly to a fluid pressure brake construction adapted for application to the front wheel of a motor vehicle.

The principal object of my invention is to provide an improved flexible diaphragm brake chamber construction adapted to be associated with the front wheel of a motor vehicle.

Figure 1:
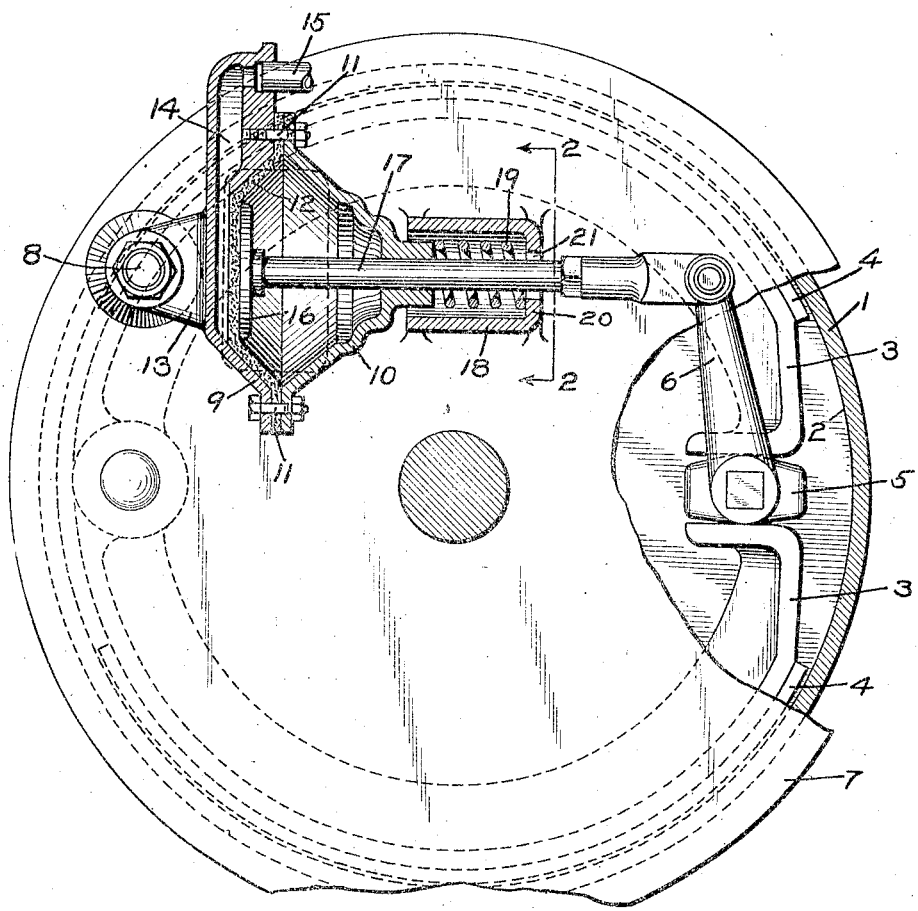

In the accompanying drawing; Fig. 1 is a face view, partly in section, of a motor vehicle brake construction embodying my invention; and Fig. 2 a section on the line 2—2 of Fig. 1.

The construction shown in the drawing comprises a brake drum 1 adapted to be secured to a vehicle wheel and having an internal friction face 2. Mounted within the brake drum 1 are pivotally connected brake heads 3 having brake shoes 4 adapted to engage the friction face 2. For spreading the brake heads 3, so that the shoes 4 will engage the brake drum, the usual cam 5 is interposed between the free ends of the brake heads, and said cam is adapted to be operated by the rocking of an arm 6.

The drum 1 is provided with the usual cover plate 7 and pivotally mounted on said plate by means of a pivot pin 8 is a brake chamber comprising casing half sections 9 and 10. Said half sections are bolted together by bolts 11, with a flexible diaphragm 12 clamped between the bolting flanges of the casing sections, the half section 9 being provided with a lug 13 having a bore within which the pivot pin 8 works.

The fluid pressure chamber 14 at one side of the diaphragm 12 is connected to a pipe 15, through which fluid under pressure is supplied to and released from the chamber 14.

At the opposite side, a pressure plate 16 engages the diaphragm 12 and is secured to a diaphragm rod 17, which extends out through a bore in the half section 10 and is pivotally connected to the end of the cam operating arm 6.

Secured to the cover plate 7 adjacent to the extending portion of the rod 17 is a lug 18 having a chamber within which is disposed a coil spring 19 which surrounds the rod 17 and which is interposed between an end portion of the section 10 and an end wall 20 of the lug 18.

Figure 2:
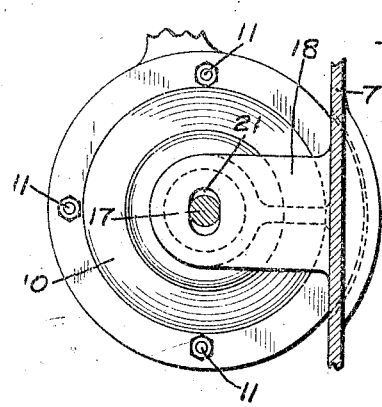

The end wall 20 is provided with an opening 21, through which the rod 17 extends, said opening being elongated to permit a rocking movement of the rod, due to the rocking of the diaphragm chamber on the pivot pin 8, but being adapted to guide the rod 17 and prevent lateral movement thereof, as will be evident from Fig. 2.

The spring 19 acts against the brake chamber and prevents rattling of the parts when in normal release position and also tends to maintain the brake chamber in neutral position, that is to say, the rod 17 and the brake chamber are moved about the pivot pin 8, as the pivot end of the arm 6 describes an arc in rocking to and fro, and in this movement, the spring 19 is compressed when the rod 17 assumes an angular position. The compressive force of the spring then tends to restore the brake chamber and the diaphragm rod to the neutral position of alinement.

Having now described my invention, what I claim as new and desire to secure by Letters Patent, is:—

1. In a vehicle brake, the combination with a brake drum having a cover plate, braking members mounted within said drum, means for expanding said braking members, and an arm for operating said means, of a fluid pressure brake chamber pivotally mounted on said cover plate, a rod connected to said arm and extending into said brake chamber, a lug carried by said cover plate, and a coil spring surrounding said rod and interposed between said brake chamber and said lug.

2. In a vehicle brake, the combination with a brake drum having a cover plate, braking members mounted within said brake drum, and means including an operating arm for expanding said braking members, of a brake chamber pivotally mounted on said cover plate, a flexible diaphragm in said brake chamber, a pressure plate engaging said diaphragm, a diaphragm rod secured to said plate and connected to said arm, a lug carried by said cover plate and having an opening through which said rod extends, and a spring interposed between said lug and said brake chamber.

3. In a vehicle brake, the combination with braking members and means including an arm for expanding said members, of a pivotally mounted brake chamber having an operating rod pivotally connected to said arm, a lug having an aperture through which said rod extends, and a spring interposed between said brake chamber and said lug and surrounding said rod.

In testimony whereof I have hereunto set my hand.

SIDNEY G. DOWN.